US008733403B2

(12) United States Patent
Diaz et al.

(10) Patent No.: US 8,733,403 B2
(45) Date of Patent: May 27, 2014

(54) WATER CONSUMPTION SAVING DEVICE TO FAUCETS IN GENERAL

(76) Inventors: Ariel Alejandro Diaz, Mar Del Plata (AR); Francisco Antonio Spinoso, Mar Del Plata (AR)

( * ) Notice: Subject to any disclaimer, the term of this patent is extended or adjusted under 35 U.S.C. 154(b) by 580 days.

(21) Appl. No.: 13/020,817

(22) Filed: Feb. 4, 2011

(65) Prior Publication Data

US 2011/0192483 A1 Aug. 11, 2011

(30) Foreign Application Priority Data

Feb. 5, 2010 (AR) ................................ P100100321

(51) Int. Cl.
*F16L 55/027* (2006.01)

(52) U.S. Cl.
USPC ............................................................ 138/42

(58) Field of Classification Search
USPC .................................... 138/37, 39, 40, 42–46
See application file for complete search history.

(56) References Cited

U.S. PATENT DOCUMENTS

| | | | | |
|---|---|---|---|---|
| 2,401,570 | A * | 6/1946 | Koehler | 138/26 |
| 2,429,297 | A * | 10/1947 | Rudolph | 138/26 |
| 3,167,305 | A * | 1/1965 | Backx et al. | 366/338 |
| 3,789,880 | A * | 2/1974 | Armstrong et al. | 137/625.3 |
| 4,043,539 | A * | 8/1977 | Gilmer et al. | 366/340 |
| 4,266,576 | A * | 5/1981 | Bradford | 138/40 |
| 4,514,095 | A * | 4/1985 | Ehrfeld et al. | 366/340 |
| 4,690,245 | A * | 9/1987 | Gregorich et al. | 181/272 |
| 5,672,821 | A * | 9/1997 | Suzuki | 73/202 |
| 6,158,546 | A * | 12/2000 | Hanson et al. | 181/255 |
| 7,066,409 | B2 * | 6/2006 | Negoro | 239/466 |
| 7,156,120 | B2 * | 1/2007 | Cherfane et al. | 137/504 |

* cited by examiner

*Primary Examiner* — Paul R Durand
*Assistant Examiner* — Vishal Pancholi
(74) *Attorney, Agent, or Firm* — Defillo & Associates, Inc.; Evelyn A Defillo

(57) ABSTRACT

Water economizer device applicable to general fittings intended for its installation in hot and cold water feeding pipes and especially between the water supply pipe for shower artifacts whereby water consumption is reduced and the same water effect and the same sensation and result of conventional fittings is maintained. It is characterized by a coupled conduit between the water supply pipe and the water outflow artifact, within which a set of items are placed successively and operatively cooperatives between each other and which includes a piece that reduces water inflow, a piece that generates water turbulence and a piece that recovers outflow direction.

8 Claims, 2 Drawing Sheets

WATER CONSUMPTION SAVING DEVICE TO FAUCETS IN GENERAL

FIELD OF THE INVENTION

This invention refers to a water economizer device applicable to general fittings, and more particularly a device to be installed in the hot and cold water feeding pipes, before the corresponding fittings, for example, showers and sink spouts, etc. whereby a reduction in the amount of water used is achieved in said sanitary artifacts, keeping the same water effect and maintaining the sensation and result of conventional fittings.

STATE OF THE ART AND ADVANTAGES OF THE INVENTION

The devices known to date operate through a reduction in the internal diameter of the water flow conduit through them. Other devices operate with air induction by the spouts; they produce the sensation without saving, the water comes out bubbling and it does not spatter, but it does not reduce water consumption. Unlike conventional devices, the device of this invention limits water consumption by 30% to 50% on showers and faucets, maintaining the water effect or blow and enabling the same functionality in water use with lower consumption. The shower jet does not splash and it adheres to the body providing a soft and pleasant sensation to the user. It enables to operate with lower boiler temperature, thus avoiding hot and cold water "mixing", and consequently, heat energy waste and it enables to decrease the electricity use for tank and cistern pumping. Moreover, in places with sewer installations, it reduces the use of atmospheric trucks and water table pollution with high levels of coli bacteria. It minimizes the environmental impact produced by sewage since they, coming from showers and sinks, are reduced by 50% on average.

SUMMARY OF THE INVENTION

The purpose of this invention is to provide a water economizer device applicable to general fittings, intended for its installation in water feeding pipes and shower artifacts, whereby reducing water consumption and keeping the same water effect and maintaining the sensation and result of conventional fittings. The device includes a conduit made up of a first stretch coupled to the water supply pipe and a second stretch where the water outlet artifact is coupled. In said first stretch, a set of items successively aligned and operatively cooperatives between each other is placed, which includes a piece that reduces water inflow, a piece that generates water turbulence and a piece that recovers outflow direction. The piece that reduces the flow is determined by a tubular body with lateral holes that deviates the water flow towards the gap between said tubular body and the first stretch of said conduit. The piece that generates water turbulence includes water drain slots adjacent to its perimeter and a central part where it leans toward the forward edge of said water flow reducing piece. The piece that recovers the outflow direction is determined by a tubular body with inflow lateral holes in turbulent state inwards from the gap between said tubular body and the first stretch of said conduit.

BRIEF DESCRIPTION OF THE DRAWINGS

For the sake of clarifying and understanding the purpose of this invention, it has been illustrated in several figures which represent it in accordance with the preferred production model, all of which by way of example, where.

DETAILED DESCRIPTION OF THE INVENTION

Figure 1:
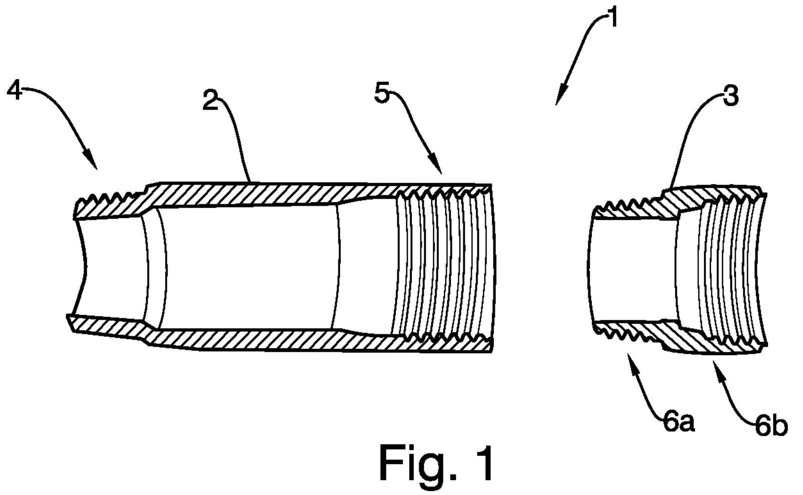
FIG. 1 shows the longitudinal section view of two stretches of the pipe used for installing the water consumption economizer device subject of this invention.
Figure 2:
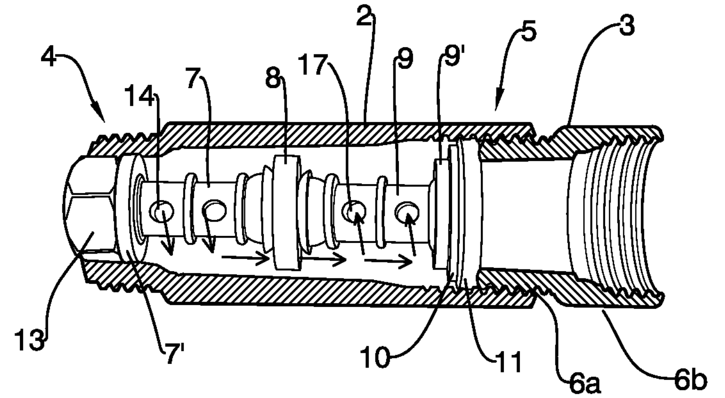
FIG. 2 shows the longitudinal section view of the pipes illustrated in FIG. 1; the different components to accomplish water consumption reduction are shown in one of them.

In FIGS. 1 and 2 the water economizer device subject of this invention includes a conduit, shown with the general reference number 1, made up of a first stretch 2 and a second stretch 3. Stretch 2 shows a rear edge 4 externally threaded from where the water supply pipe is coupled, and a forward edge 5 internally threaded where stretch 3 is coupled, for which, this last stretch presents in turn, a forward edge **6*a* externally threaded and also, a forward edge 6*b*** internally threaded to couple the inflow artifact such as a shower.

Figure 3:
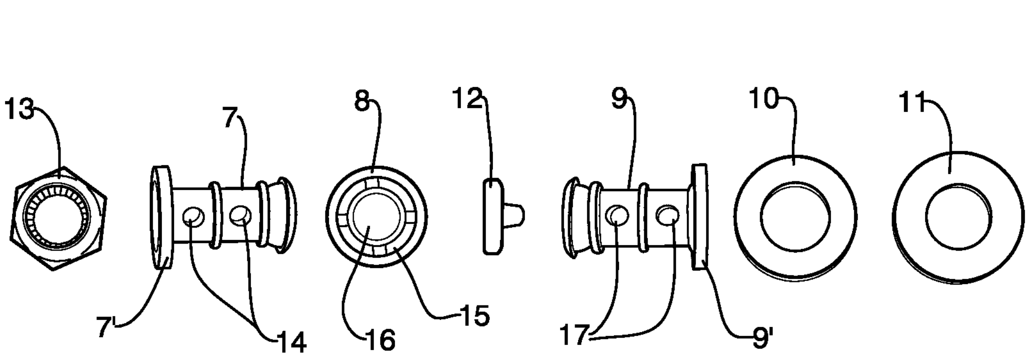
FIG. 3 shows each one of the components intended for reducing water consumption separately.

Within stretch 2 of conduit 1, as shown in FIG. 2, a set of items that are aligned successively and operatively cooperatives is placed between each other, which are shown separately in FIG. 3; its structural and functional combination enables to save water consumption. Said set of items includes piece 7 that reduces the water inflow, a piece 8 that generates water turbulence and a piece 9 that recovers inflow direction. Stretch 3, in turn, determines a means of retention of said items in stretch 2 of conduit 1. In FIG. 2, and more clearly in FIG. 3, it can be noticed that said set of items includes a washer 10 and an elastomeric ring 11, the purpose is to make a hermetic seal between stretches 2 and 3 of conduit 1; a plug 12 that is inserted in the rear edge of piece 9 and a nut 13 to retain piece 7 in the internal part of stretch 2 from the rear edge.

Piece 7 that reduces the flow is determined by a tubular body with lateral holes 14 that deviates the water flow that enters the device towards the gap between said tubular body and stretch 2 of conduit 1. The rear edge of the piece of said tubular body 7, adjacent to the water entry, shows a perimeter flange 7' diameter complementary with the internal diameter of the rear edge of stretch 4 of conduit 1.

Piece 8, which generates water turbulence, shows a discoidal structure, of complementary diameter with the internal average diameter of stretch 2 of conduit 1 and it includes slots 15 adjacent to its perimeter for water drain coming from the gap between the tubular body 7 and stretch 2 of conduit 1, and a central part 16 where it leans the rear edge of said tubular body 7.

Piece 9 that recovers the water outflow direction is determined also by a tubular body that shows lateral holes 17; water that goes through slots 15 of piece 8 enters to its internal part through said holes. The rear edge of the piece or tubular body 9 leans on the central part of the discoidal piece 8 through plug 12, and its forward edge shows a perimeter flange 9' for the appropriate support of the washer 10 and the elastomeric ring 11.

Figure 6:
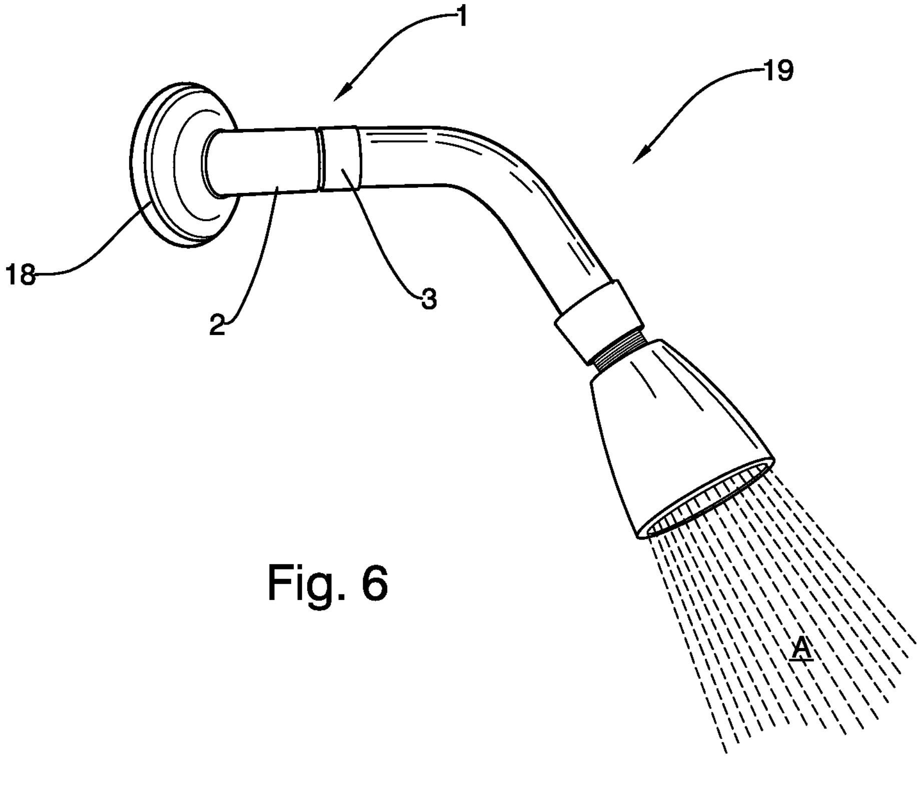
FIG. 6 shows a perspective view that illustrates a shower artifact with the device of this invention incorporated thereto.

In accordance with the above description, the device subject of this invention has been designed, it is a "turbulent water generator" that, by mixing up the water that flows through it, limits the water flow by the outflow of the fittings and it keeps the same water blow effect. Water that flows through the pipes of medium section increases its pressure by entering into the tubular body 7, by presenting an internal diameter of the lower section. This tubular body 7 generates the first step of water revolution by driving it towards the gap between the inner wall of stretch 2 of the device and the external part of said tubular body 7, the holes 14 of which change their water flow path by 90 degrees. Then, water passes through the slots 15 of the discoidal piece 8 which produces the maximum water flow turbulence. Afterwards, the tubular body 9 redirects the water flow to a turbulent state, thus enabling water by the device outlet, to produce the same effect, sensation and cleanliness result of the standard fittings but consuming between 35% to 50% of its flow. At different dates, the current water path is represented, from the moment water enters the device to the moment it comes out of the artifact connected to it, for instance, the shower illustrated in FIG. 6.

Figure 4:
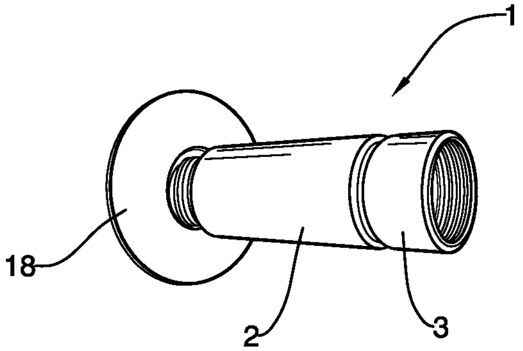
FIG. 4 shows a front perspective view of the device of this invention illustrated crossing through the showerhead then leans on a wall of the corresponding space.
Figure 5:
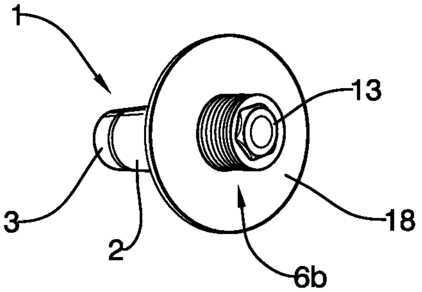
FIG. 5 shows the back perspective view of the device where it is also illustrated crossing through the showerhead.

In the front and back perspectives of FIGS. 4 and 5, we can see how the device subject of this invention passes the threaded edge of stretch 2 through a showerhead 18 of the shower artifacts that leans on the wall of the corresponding space. In turn, in the perspective of FIG. 6, the installation of the device of this invention is shown coupled to the rear edge of the shower 19, and also representing the water aspect, shown with reference A, that comes out in the conditions accomplished by means of the device of this invention.

Water economizer device applicable to general fittings intended for its installation in hot and cold water feeding pipes and especially between the water supply pipe for shower artifacts whereby water consumption is reduced and the same water effect and the same sensation and result of conventional fittings is maintained. It is characterized by a coupled conduit between the water supply pipe and the water outflow artifact, within which a set of items are placed successively and operatively cooperatives between each other and which includes a piece that reduces water inflow, a piece that generates water turbulence and a piece that recovers outflow direction.

The invention claimed is:

1. A water consumption saving device for general fittings designed to be installed between a water supply pipe and a water outflow device, the water consumption saving device comprising:

a first section including a body having a first edge, a second edge, and an internal cavity having an internal diameter, the first edge of the body of the first section is designed to be threaded to the water supply pipe for receiving a flow of water;

a second section including a body having a first edge and a second edge, the first edge of the body of the second section is threaded to the second edge of the body of the first section, the second edge of the body of the second section is designed to be threaded to the water outflow device;

the interior cavity of the body of the first section includes:

a flow reduction piece, the flow reduction piece includes a tubular body having a first end, a second, end, an internal diameter smaller than the internal diameter of the first section and a first set of lateral holes, the first set of lateral holes facing a gap formed between the first section and the tubular body of the flow reduction piece;

a water turbulence piece connected to the flow reduction piece, the water turbulence piece includes a disk having an internal space that corresponds to the internal diameter of the flow reduction piece and a perimeter having a flange with a diameter greater than the diameter of the internal space of the disk, a plurality of slots are spaced through the flange of the disk, the plurality of slots are placed facing perpendicular to the flow reduction piece; and an outflow direction recovery piece connected to the water turbulence piece, the outflow direction recovery piece includes a tubular body having an internal diameter that corresponds to internal space of the disk of the water turbulence piece and a second set of lateral holes, the second set of lateral holes face the gap formed between the first section and the tubular body of the outflow direction recovery piece.

2. The water consumption saving device according to claim 1, wherein the first set of lateral holes of the flow reduction piece deviate the water flow entering the first section towards the gap between said first section and the tubular body of the flow reduction piece.

3. The water consumption saving device according to claim 1, further including a flange connected to the first end of the flow reduction piece.

4. The water consumption saving device according to claim 1, further including a plug located between the water turbulence piece and the outflow direction recovery piece.

5. The water consumption saving device according to claim 1, further including at least one hermetic sealed ring between the outflow direction recovery piece and the second section.

6. The water consumption saving device according to claim 1, further including a retainer device to retains the flow reduction piece, the water turbulence piece, and the outflow direction recovery piece inside the interior cavity of the body.

7. A water consumption saving device for general fittings designed to be installed between a water supply pipe and a shower head, the water consumption saving device comprising:

a first section including a body having a first edge having external threads, a second edge having internal threads, and an internal cavity having an internal diameter, the first edge of the body of the first section is designed to be threaded to the water supply pipe for receiving a flow of water;

a second section including a body having a first edge and a second edge, the first edge of the body of the second section is threaded to the second edge of the body of the first section, the second edge of the body of the second section is designed to be threaded to the shower head;

the interior cavity of the body of the first section includes:

a flow reduction piece, the flow reduction piece includes a tubular body having a first end, a second end, an internal diameter smaller than the internal diameter of the first section and a first set of lateral holes, the first set of lateral holes facing a gap formed between the first section and the tubular body of the flow reduction piece, the first set of holes deviate the water flow by 90 degrees towards the gap;

a water turbulence piece connected to the flow reduction piece, the water turbulence piece includes a disk having an internal space that corresponds to the internal diameter of the flow reduction piece and a perimeter having a flange with a diameter greater than the diameter of the internal space of the disk, a plurality of slots are spaced through the flange of the disk, the plurality of slots are placed facing perpendicular to the flow reduction piece;

an outflow direction recovery piece connected to the water turbulence piece, the outflow direction recovery piece includes a tubular body having an internal diameter that corresponds to internal space of the disk of the water turbulence piece and a second set of lateral holes, the second set of lateral holes face the gap formed between the first section and the tubular body of the outflow direction recovery piece, the second set of lateral holes brings the water from the gap between the first section and the tubular body of the outflow direction recovery piece to inside the outflow direction recovery device;

a plug located between the water turbulence piece and the outflow direction recovery piece;

an elastomeric ring located on the outflow direction recovery piece and the second section.

8. A water consumption saving device for general fittings designed to be installed between a water supply pipe and a shower head, the water consumption saving device consisting of:

a first section including a body having a first edge, a second edge, and an internal cavity having an internal diameter, the first edge of the body of the first section is designed to be threaded to the water supply pipe for receiving a flow of water;

a second section including a body having a first edge and a second edge, the first edge of the body of the second section is threaded to the second edge of the body of the first section, the second edge of the body of the second section is designed to be threaded to the shower head;

the interior cavity of the body of the first section includes:

a flow reduction piece, the flow reduction piece includes a tubular body having a first end, a second end, an internal diameter smaller than the internal diameter of the first section and a first set of lateral holes, the first set of lateral holes facing a gap formed between the first section and the tubular body of the flow reduction piece;

a water turbulence piece connected to the flow reduction piece, the water turbulence piece includes a disk having an internal space that corresponds to the internal diameter of the flow reduction piece and a perimeter having a flange with a diameter greater than the diameter of the internal space of the disk, a plurality of slots are spaced through the flange of the disk, the plurality of slots are placed facing perpendicular to the flow reduction piece; and an outflow direction recovery piece connected to the water turbulence piece, the outflow direction recovery piece includes a tubular body having an internal diameter that corresponds to the internal space of the disk of the water turbulence piece and a second set of lateral holes, the second set of lateral holes face the gap formed between the first section and the tubular body of the outflow direction recovery piece.

* * * * *